United States Patent [19]

Saleeb et al.

[11] Patent Number: 4,460,612

[45] Date of Patent: Jul. 17, 1984

[54] PROCESS FOR PREPARING CARBONATED LIQUIDS WITH COATED CHARCOAL

[75] Inventors: Fouad Z. Saleeb, Pleasantville; Annette Mitchell, Ossining, both of N.Y.

[73] Assignee: General Foods Corporation, White Plains, N.Y.

[21] Appl. No.: 83,510

[22] Filed: Oct. 10, 1979

[51] Int. Cl.³ .............................................. A23L 2/40
[52] U.S. Cl. ...................... 426/477; 426/86; 426/67; 426/132; 426/394; 426/422
[58] Field of Search .................. 426/96, 97, 99, 90, 426/477, 591, 91, 89, 67, 422, 420, 132, 424, 474, 477, 590, 86, 394; 252/455 Z, 444, 445, 497 R

[56] References Cited

U.S. PATENT DOCUMENTS

| | | | |
|---|---|---|---|
| 541,255 | 6/1895 | Wichmann | 426/96 |
| 1,286,904 | 12/1918 | Atkinson | 426/99 |
| 1,573,509 | 2/1926 | Bateman | 252/445 |
| 2,107,559 | 2/1938 | Beck | 426/591 |
| 2,111,436 | 3/1938 | Pie | 252/444 |
| 2,721,184 | 10/1955 | Voorhies | 252/445 |
| 2,742,363 | 4/1956 | Hughes | 426/591 |
| 2,868,646 | 1/1959 | Schapiro | 426/591 |
| 3,370,956 | 2/1968 | Reitman et al. | 426/96 |
| 3,607,303 | 9/1971 | Bingham | 426/477 |
| 3,666,496 | 5/1972 | Honey et al. | 426/96 |
| 3,677,774 | 7/1972 | Rausing | 426/396 |
| 3,888,998 | 6/1975 | Sampson et al. | 426/477 |
| 3,950,267 | 4/1976 | Arakawa et al. | 252/444 |
| 3,981,698 | 9/1976 | Leppard | 55/68 |
| 4,110,255 | 8/1978 | Liepa et al. | 426/67 |

FOREIGN PATENT DOCUMENTS

| | | | |
|---|---|---|---|
| 2281068 | 4/1976 | France | 426/89 |
| 1417937 | 12/1975 | United Kingdom | 426/591 |

*Primary Examiner*—Steven L. Weinstein
*Attorney, Agent, or Firm*—Joseph T. Harcarik; Thomas R. Savoie; Dan J. Donovan

[57] ABSTRACT

Carbonated aqueous liquids can be prepared at ambient pressure with activated charcoals containing adsorbed carbon dioxide and a coating of a small organic compound such as a di or tricarboxylic acid, a $C_{10}$–$C_{18}$ fatty acid or a monocyclic terpene or related compound.

8 Claims, 3 Drawing Figures

PROCESS FOR PREPARING CARBONATED LIQUIDS WITH COATED CHARCOAL

BACKGROUND OF THE INVENTION

1. Field of the Invention

This invention relates to carbonated beverages. More particularly, it relates to consumer or "at home" preparation of carbonated beverages under normal conditions of temperature and pressure. This invention especially relates to the preparation of carbonated beverages from coated crystalline zeolites or coated activated charcoal which have carbon dioxide adsorbed therein.

2. Description of the Prior Art

Attempts to commercialize point of consumption or at home preparation of carbonated beverages have not met with any lasting success over the years. The principal shortcoming of the several techniques has been that the consumer-prepared carbonated beverage has been significantly inferior in one or more aspects to the bottled or canned carbonated beverages available in stores and supermarkets. The most common complaints leveled at the carbonated beverage prepared by the consumer are that the quality and the quantity of the carbonation, the bubble size and the duration of the effervescence does not compare favorably with the commercially-available bottled carbonated beverage.

On the other hand, there are significant advantages to consumer preparation of carbonated beverages vis-a-vis packaged liquid carbonated beverages. Thus, the use of glass, metal or other bulky containers is avoided, the necessity of bottling, shipping and storing carbonated beverages consisting of a major percentage of water is eliminated and the utility in terms of portability by the user is greatly enhanced. Thus, campers, backpackers, hunters, fishermen, outdoor spectators, housewives and travellers can enjoy a carbonated beverage without having to transport bulky and heavy quantities of the canned or bottled variety. Further, disposable and returnable cans and bottles would no longer be of major concern to environmentalists who have been seeking ways to conserve both the country's natural resources and natural beauty.

U.S. Pat. No. 2,073,273 to Wetstein discloses a means to prepare a carbonated beverage wherein water plus sweetener and flavor is placed in a small pressure vessel and a metal cartridge containing carbon dioxide is inserted into the sealed vessel where movement of the cartridge causes a piercing of the cartridge thereby injecting the carbon dioxide into the water to form the carbonated beverage. The carbon dioxide also pressurizes the vapor space above the liquid causing the carbonated beverage to pass out of the vessel through a serving nozzle when an external valve is opened. This device met with some measure of success in preparing unflavored and unsweetened carbonated water for home use but the carbonation was not equivalent to that of bottled club soda.

The prior art includes a significant number of dry compositions for use in preparing carbonated beverages at home. In most of these a source of carbonate and acid, known in the art as a chemical "couple", is combined with sweeteners and a source of flavor so that upon addition of the composition to a glass of water, the "couple" reacts to yield carbon dioxide and at least some measure of carbonation to the beverage. U.S. Pat. No. 2,603,569 to Alther discloses the carbonation of a citric acid-sucrose complex with a sodium bicarbonate sucrose complex. U.S. Pat. No. 2,742,363 to Hughes claims a combination of an alkali metal bicarbonate and a sulfonic acid ion exchange resin in its hydrogen form. In U.S. Pat. Nos. 2,851,359 and 2,953,459 to Diller a highly soluble phosphate and a slowly soluble phosphate are combined with an alkali metal or ammonium carbonate or bicarbonate to prolong the ebullition of the beverage. U.S. Pat. No. 3,241,977 to Mitchell et al. discloses chemical carbonation with citric, adipic or tartaric acid in finely divided form and which is said to approximate the carbonation sensation of cola-type beverages sold in air-tight bottles or cans which are produced by a saturated solution containing several volumes of carbon dioxide. U.S. Pat. No. 3,441,417 to Feldman et al. discloses a dry beverage composition adapted to be reconstituted with water to an effervescent beverage which includes as an essential carbonating ingredient, an organic compound having a carbonic acid anhydride group capable of controlled hydrolysis in water to release carbon dioxide at a substantially uniform rate. U.S. Pat. No. 3,667,962 to Fritzberg et al. discloses a carbonation composition utilizing two distinct bodies formed from an aqueous solution of a saccharide, one contains an edible food acid and the other an edible bicarbonate. Upon addition to water the two tablets dissolve quickly and react to evolve carbon dioxide.

Many of the dry powder chemical couples have a common and acknowledged defect, an unpleasant taste in the beverage directly resulting from the components of the powder. U.S. Pat. No. 2,742,363 to Hughes and U.S. Pat. No. 3,476,520 to Hovey addressed this problem by placing the chemicals in a container which is pervious to gas and water but impervious to solid reactants and by-products. U.S. Pat. No. 2,975,603 to Barnes et al. takes another approach by utilizing carbonated ice containing at least 25 milliliters of carbon dioxide per gram of ice as the source of carbonation U.S. Pat. Nos. 3,888,998 to Sampson et al., 3,992,493 and 4,025,655 et Whyte et al. and 4,007,134, 4,110,255 and 4,147,808 to Liepa et al. disclose carbonation methods, compositions and devices whereby carbon dioxide containing molecular sieves are used to carbonate aqueous solutions. Carbonation levels seldom exceeded 1.5 volumes.

The Sampson et al. and Whyte et al. patents also disclose that the carbon dioxide release rate from molecular sieves can be retarded and controlled by coating the molecular sieves with non-toxic, water-soluble polymers. The effect on the final carbonation level is not disclosed.

A commonly assigned and copending patent application Ser. No. 210,997, filed Nov. 28, 1980, and now abandoned, which is a continuation of Ser. No. 083,736, filed Oct. 10, 1979 and now abandoned discloses a carbonation method involving the use of activated charcoal having carbon dioxide adsorbed thereon. The activated charcoal technique permitted the preparation of carbonated beverages under ambient temperature and pressure conditions with carbonation levels approximating carbon dioxide solubility in water (1.3 volumes at 5° C., 1 atmosphere). Higher carbonation levels were achieved by using a closed system involving superatmospheric pressure.

It is an object of this invention to provide a simple, efficient process for point of consumption preparation of carbonated beverages under normal pressure conditions to produce a product having an enhanced carbonation level as compared to carbonated beverages prepared heretofore in the home under normal conditions of temperature and pressure.

SUMMARY OF THE INVENTION

In accordance with the present invention, it has been found that carbonated water and/or beverages having superior carbonation levels can be prepared under normal conditions of temperature and pressure by contacting water with carbon dioxide loaded molecular sieves or activated charcoal which have been coated with thin layers of monomeric organic compounds. More particularly this invention is directed to a process of carbonating an aqueous liquid which comprise contacting an aqueous liquid under atmospheric or superatmospheric pressure with an effective amount of an adsorbent coated with a layer of small organic compound with a molecular weight below 500 and having adsorbed therein at least 20 cm$^3$ of carbon dioxide per gram of adsorbent, said adsorbent being a crystalline zeolite or an activated charcoal.

This invention is also directed to a carbonation composition for preparing carbonated aqueous liquids which comprises an effective amount of an adsorbent coated with a layer of a small organic compound and having adsorbed therein at least 20 cm$^3$ of carbon dioxide per gram of adsorbent, said adsorbent being a crystalline zeolite or an activated charcoal.

This invention is further directed to a process of preparing a carbonating composition which comprises:
 (a) contacting an adsorbent with a vapor or liquid solution of a small organic compound or its corresponding sodium or potassium salt whereby a coating of said organic compound is applied to the adsorbent, said adsorbent being a a crystalline zeolite or an activated charcoal,
 (b) separating said coated adsorbent from said solution,
 (c) drying said coated adsorbent,
 (d) contacting said coated adsorbent with carbon dioxide whereby at least 20 cm$^3$ of carbon dioxide is adsorbed per gram of adsorbent.

BRIEF DESCRIPTION OF THE DRAWINGS

The present invention will be more readily understood by reference to the accompanying drawings.

DESCRIPTION OF THE PREFERRED EMBODIMENTS

Figure 1:
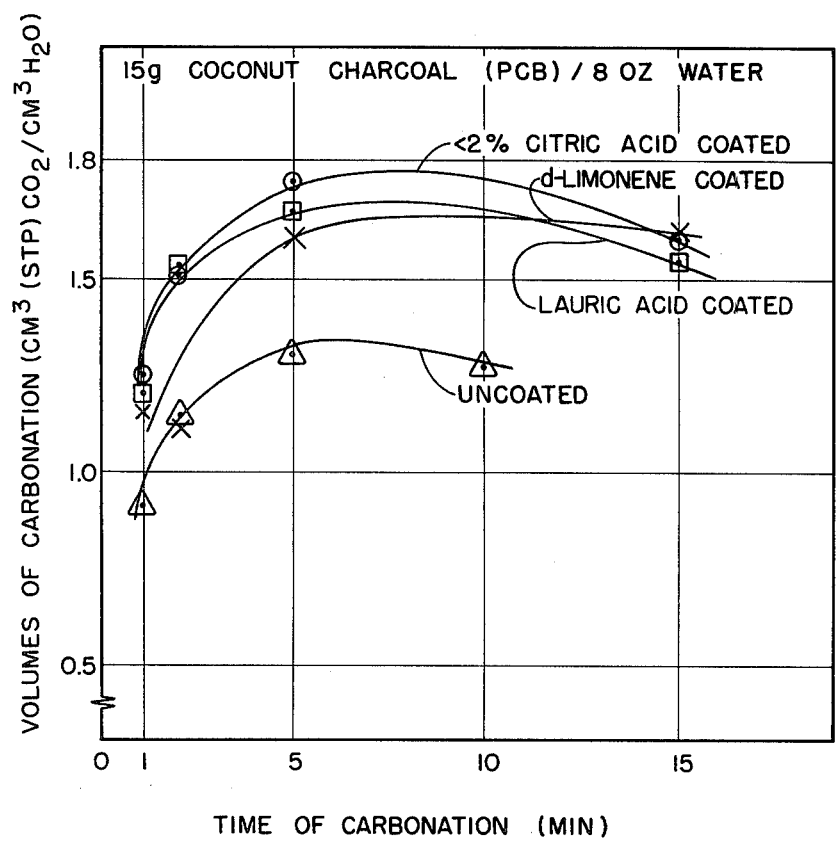
FIG. 1 is a graph of the volumes of carbonation produced versus time by activated coconut charcoal uncoated and coated with several different monomeric organic compounds.

The present invention provides a process for preparing carbonated beverages in the home without the necessity of employing a pressurized closed system. The beverage produced has a higher degree of carbonation than is achieved by other in-the-glass methods and does not possess the off-taste often produced by the chemical couple methods. The present invention also provides a process of preparing carbonated beverages utilizing a closed system at superatmospheric pressure.

Briefly, the present method employs an adsorbent of either activated charcoal or crystalline zeolite which has been coated with a layer of a monomeric organic compound before having carbon dioxide adsorbed therein. The $CO_2$ loaded adsorbent is contacted with an aqueous liquid under atmospheric pressure to produce a carbonated liquid having a higher degree of carbonation than is obtained from the same $CO_2$ loaded adsorbent which has not been provided with the pre-adsorption coating. Thus, the invention permits point of consumption preparation of carbonated beverages having superior carbonation levels utilizing the usual serving pitchers and/or glasses available in the home. The use of special preparation equipment, such as a closed pressure vessel, is not required. However, where higher carbonation levels are desired a closed pressure vessel may be employed.

The activated charcoals which may be usefully employed in the present invention are those disclosed in the commonly assigned and copending patent application described hereinbefore. This disclosure is incorporated herein by reference. Briefly, the disclosure describes the useful activated charcoals as having an adsorptive capacity for carbon dioxide under normal conditions of temperature and pressure and capability of releasing the carbon dioxide when the charcoal is contacted with water. These charcoals have pores in the range of about 4 to about 20 Angstroms although pore sizes up to about 50 Angstroms can be used if the $CO_2$ is adsorbed at sub-ambient temperatures and/or superatmospheric pressure. Activated charcoal prepared from such natural products as coal, petroleum, polysaccharides and cellulosics are disclosed as being preferred with activated charcoal from coconut shells being particularly preferred.

The second type of adsorbent which is operable in the present invention is known as a molecular sieve. These materials are also known as crystalline zeolites or crystalline aluminosilicates. These terms may be used interchangeably herein but in all instances are used herein to refer to the same crystalline materials. U.S. Pat. No. 3,888,998 of Sampson et al., discussed hereinbefore, discloses a number of molecular sieves (crystalline zeolites) which may be loaded with carbon dioxide and utilized to prepare carbonated liquids. These useful molecular sieves may also be employed in the present invention. The disclosures of Sampson et al. regarding useful molecular sieves and the manner of adsorbing carbon dioxide thereon are incorporated herein by reference. Zeolite A and zeolite X are the classes of crystalline zeolites which Sampson et al. found useful, with zeolite X being preferred and zeolite 13X being particularly preferred. These preferences are also applicable to the present invention.

Sampson et al. found that coatings of non-toxic water soluble polymers on the molecular sieves retarded and controlled the carbon dioxide release rate in water. The coatings employed in the present invention are not polymers but rather are monomeric organic compounds having ordinary molecular weights less than about 500. The use of the term "monomeric" organic compounds is used herein to distinguish the organic compounds which may usefully be employed in this invention from organic polymers. However, dimers and trimers of the useful "monomers" are included within the definition of monomeric organic compounds as it is used herein. Useful coatings on the activated charcoals and crystalline zeolites which are used in practicing the present invention may be prepared from a variety of non-toxic compounds such as di and tri-carboxylic acids, fatty acids and monocyclic terpenes and related compounds. Useful di and tri-carboxylic acids include citric, succinic, adipic, malic and maleic acids with citric acid being preferred. Useful fatty acids are the $C_{10}$–$C_{18}$ fatty acids such as capric, lauric, myristic, palmitic and stearic acids with lauric acid being preferred. Among the useful monocyclic terpenes and related compounds are d-limonene, α-pinene, β-pinene and β-cymene with d-limonene being preferred. Solvent soluble salts of these monomeric organic compounds may also be usefully employed.

The coatings may be applied directly to an adsorbent or by preparing a liquid solution of the useful compound being employed with an appropriate solvent and contacting with adsorbent with the solution. Aqueous solutions are preferred. Where a compound is insoluble or has very limited solubility in water, the sodium or potassium salt may be utilized. Contacting the adsorbent with the solution for 1–2 hours will usually provide a proper coating. Where a solution is particularly dilute or a heavier coating is desired, a prolonged contact time may be required. An overnight soaking period is normally sufficient in these situations.

Thick coatings of the useful compounds are not necessary and may even be undesirable; thin coatings are sufficient to achieve the desired results. A small amount of coating increases the carbonation efficiency but too much can produce no benefit or may even cause a negative effect on carbonation. Too thick a coating may in some cases cause pore blockage and decrease the $CO_2$ adsorption capacity of the adsorbent. In terms of weight percentage of the adsorbents, coatings of up to about 4 wt. %, preferably up to about 2 wt. % are employed.

Following the application of the coating, the adsorbents are dried, e.g., with air, prior to being loaded with carbon dioxide. Adsorbing carbon dioxide onto coated adsorbents is accomplished by contacting the dried coated adsorbent with carbon dioxide under substantially anhydrous conditions in accordance with the procedures disclosed in the aforesaid copending application regarding activated charcoal and the Sampson et al. patent regarding molecular sieves (crystalline zeolites). These disclosures are incorporated herein by reference. Briefly, these procedures can be conducted by placing the coated adsorbent in a column and, where dehydration is desired or necessary, passing a stream of heated dry gas, such as air or nitrogen though the bed of adsorbent until the moisture level is reduced to a low level, typically 2 wt.% or less of the adsorbent. Following this, liquid or gaseous carbon dioxide is passed through the column to load the coated adsorbent with carbon dioxide. Although satisfactory adsorptive levels are achieved at ambient conditions, higher loading can be achieved at sub-ambient temperatures and/or super-atmospheric pressures. Any sub-ambient temperature is useful with a practical limit being the sublimation of dry ice at 1 atmosphere minus 78.5° C. Elevated pressures of up to about 80 psig, preferably up to about 50 psig, can be usefully employed. To summarize, the $CO_2$ loading conditions include a temperature of about 35 to about minus 78° C. and a pressure of 0 to about 80 psig.

The thin coatings applied to the adsorbent do not substantially interfere with or reduce the adsorptive capacity of the adsorbent. Thus, at least 20 cm$^3$ of $CO_2$ per gram of adsorbent, preferably 40 cm$^3$/gram, are adsorbed onto the coated adsorbents. As used herein, the volume of $CO_2$ adsorbed is measured at standard conditions of temperature and pressure. 0°/C. and 1 atmosphere. Higher adsorptive levels may be obtained with particular activated charcoals or molecular sieves even at ambient conditions. Where lower temperatures and/or elevated pressures are employed even higher adsorptive levels can be obtained.

The $CO_2$ loaded adsorbent is a stable product and can be stored until it is desired to prepare carbonated beverages. However, since water will displace the adsorbed carbon dioxide from the adsorbent, it is important that appropriate storage conditions be used. Efficient storage may be provided by storing the adsorbent under substantially anhydrous conditions. Where elevated pressures were used for the $CO_2$ adsorption, the adsorption level may be maintained by storing the adsorbent at substantially the same pressure employed for the adsorption or at a storage pressure slightly above the adsorption pressure. Similarly, where lower temperatures are employed to increase the $CO_2$ adsorption over that obtained at ambient or slightly above ambient temperatures, the storage temperature should be no more than the adsorption temperature to maintain the $CO_2$ loading. The coated adsorbent can be packaged under anhydrous conditions in sealed packages which can then be stored at the required temperature, for example, in a refrigerator or freezer. Where elevated storage pressures are required, the storage vessel obviously must be capable of maintaining that pressure during the storage period. Since storage pressures of 80 psig and less are usually sufficient, a soft drink can or similar metal container can serve as a storage vessel. By providing the proper storage containers or packages and the necessary storage temperature and/or pressure, coated activated charcoal and/or coated molecular sieves containing adsorbed carbon dioxide can be stored essentially indefinitely. A shelf life of several months and usually substantially longer, can be readily achieved.

Where the coated adsorbents, loaded with $CO_2$, are packaged in a storage vessel, preferably the container should be pressured with an inert gas, ideally carbon dioxide, so as to maintain the $CO_2$ adsorptive level. The storage vessel can be provided in a variety of sizes to satisfy the variations in the consuming public's requirements. In one embodiment, an aluminum can be provided with one of the convenient "poptop" lids can serve as the pressurized storage container. Alternately, the container can be provided with a removable or a pierceable cover. In another embodiment, a container can be designed to fill three functions—storage container, carbonation vessel and drinking glass or serving pitcher. Such a container would be provided with a quantity of adsorbent to provide sufficient carbonation when the container is used as the beverage preparation vessel. Additionally, a quantity of dry beverage mix could also be provided so that a flavored carbonated beverage can be prepared. Since the solid adsorbent will remain in the vessel after the beverage is prepared and the same vessel will be used as a drinking glass or serving pitcher, the adsorbent is ideally confined in a chamber within the vessel which has a surface pervious to gas and liquid but imperious to solids. Alternately, the adsorbent can be enclosed in an envelope or bag having a surface which permits the passage of $CO_2$ and water but retains the solid adsorbent within its interior. This carbonation "package" is ideally suited to campers, mobile home residents, and others who wish to prepare a carbonated beverage themselves with a minimum of inconvenience.

The water employed to prepare carbonated beverages according to this invention may be any type of drinking water available to the user. Household tap water, bottled water, fresh drinking water from a campsite stream, etc. are examples of water available at point of consumption preparation of these carbonated beverages.

In accordance with the practice of this invention water and coated activated charcoal or coated molecular sieves containing at least 20 cm$^3$ of adsorbed carbon dioxide per gram of charcoal are contacted in a vessel, viz. drinking glass, pitcher, storage container, etc. The water displaces the carbon dioxide releasing it to the body of water where it is dissolved to produce carbonated water. In a preferred embodiment, coloring, flavoring and sweetener are added or dissolved in the water so as to produce a carbonated beverage. The coloring, flavoring and sweetener can conveniently be provided in a syrup form, available commercially, or in a dry mix, also available commercially. In this fashion, such familiar beverages are carbonated cola, carbonated root beer, carbonated lemon-lime soda, carbonated cream soda, etc. can be prepared at home. Only the ingenuity of the user, the availability of flavored syrup or dry mix and the individual tastes of the consumers limit the variety of carbonated beverages which may be prepared by the process of this invention.

Carbonation is usually achieved in accordance with the present invention by placing the coated adsorbent, loaded with $CO_2$ in a vessel and adding the liquid to be carbonated so that it covers the adsorbent. Since the adsorbent remains in the vessel following carbonation, the carbonated liquid and the solid adsorbent must be separated by, for example, decanting, filtration or straining of the carbonated liquid. Alternately, the adsorbent can be confined in a chamber in the vessel having a surface which is pervious to gas and liquid but impervious to solids. In a similar fashion the coated adsorbent loaded with $CO_2$ can be contained in an envelope or bag having a surface which permits the passage of $CO_2$ and water but retains the solid charcoal within its interior.

The carbonation achieved by the practice of this invention under ambient conditions exceed 1 volume and generally is in the range of 1.3–1.7. Carbonation in the soft drink beverage industry is expressed as "volumes of carbonation" and is defined as the volume of $CO_2$ (measured at standard conditions of 0° C. and 1 atmosphere) dissolved per volume of carbonated liquid.

Where higher volumes of carbonation are desired, i.e. from about 1.7 to about 4.0, carbonation with coated adsorbents must be conducted, in accordance with the present invention, in a closed vessel at superatmospheric pressure of up to about 80 psig. In achieving these higher carbonation levels, it is preferred to use coated adsorbents having higher loadings of $CO_2$, e.g. above about 80 cc/g, preferably about 100 cc/g. These levels may be achieved at loading conditions of reduced temperature and/or elevated pressure. Since the upper limit of loading pressure is about 80 psig there is an inherent safety aspect in the superatmospheric carbonation, the maximum pressure that is developed in the closed vessel is that which was employed in adsorbing the carbon dioxide onto the coated adsorbents. Although it is preferred that a head space be provided above the liquid in the closed carbonation vessel, this is not critical when coated adsorbents are the source of the carbonation since these materials release the carbon dioxide at a rate essentially the same as the rate at which the liquid is being carbonated thereby eliminating the danger of excessive pressure buildup. Therefore closed vessel carbonation with the coated adsorbents of this invention can be conducted without an appreciable head space. Uncoated molecular sieves, on the other hand, release carbon dioxide so rapidly when contacted with water that an appreciable head space is required above the liquid where the carbonation is conducted in a closed vessel. Even with a head space, the carbon dioxide released from uncoated molecular sieves may develop an undesirable high pressure.

When carbonation is conducted at superatmospheric pressure, a closed vessel or assembly, capable of withstanding pressure of up to about 80 psig can be employed. In one embodiment, a rigid receptacle in the shape of a wide-mouth bottle serves as the container for the liquid to be carbonated. A domed cover adapted to be affixed to the container serves as the receptacle for the adsorbent. This domed cover is provided with a hinged screen which extends across the open end of the cover. When the cover is affixed to the container, the screen partitions off the inside of the cover from the lower container. The openings in the screen are sized to permit free passage of gas and liquid while preventing the passage of the adsorbent in the form it is being employed. In use, the domed cover is removed from the lower container, and tap water is placed in the lower container. Optionally, a flavored syrup or dry mix containing coloring, flavoring, and sweetner is admixed with the water in the lower container. The screened portion of the cover is swung back, the necessary quantity of $CO_2$ loaded adsorbent is placed inside and domed cover, the screen is placed back into position and retained thereby fastening means provided for that purpose. The cover is then affixed to the lower container and the entire assembly is placed in an inverted position so as to bring the water and the adsorbent into contact. Following a sufficient period of time for the water to displace the carbon dioxide and effect carbonation of the liquid, the apparatus is returned to its upright position. A spring loaded, manually operated valve, provided in the domed cover for the purpose, is depressed to relieve the pressure within the closed vessel. The cover is then removed to dispense the carbonated beverage into serving glasses.

In another embodiment, the adsorbent and water are both placed in the same portion of the apparatus and the cover is affixed. Following sufficient time for the carbonation, the cover is removed and the beverage is poured through a screen to separate the adsorbent from the beverage.

The activated charcoal and molecular sieve may usefully be employed in a variety of shapes and forms. Granules, powder or pellets are readily available forms of these adsorbents which may be employed. By combining these forms of absorbent with appropriate, inert binders, such as clay, etc., discs of activated charcoal or molecular sieves may be prepared which can be employed in practicing this invention.

As discussed above, carbonation with a chemical couple, often produces a salty taste which is unpleasant to a large percentage of the public. This is one of the serious drawbacks of this type of point of consumption carbonation. However, the salt produced by the couple must reach a threshold concentration before the consumer becomes aware of the salt taste. Often, 0.5 to 1.0 volumes of carbonation can be produced from a chemical couple before the consumer can perceive a salty off-flavor. Therefore since there are economic advantages for using the couple, carbonation can be achieved by combining a low level of chemical couple carbonation with the carbonation from the $CO_2$ loaded adsorbent used in this invention to produce a high level of carbonation in soft drink bevereages without a noticable salty off-taste.

The following examples will serve to illustrate the subject invention.

EXAMPLE I

A series of runs were made to evaluate the effect of thin coatings or monomeric organic compounds on the carbonation levels achieved with activated charcoals.

Dilute solutions of citric acid, lauric acid and d-limonene were prepared. Activated coconut charcoal (type PCB, manufactured by Calgon) was added to each of the aqueous solution. After a thin coating (about 1–2 wt. % based on the charcoal) of the organic compound had been applied to the charcoal, the solution was decanted and the charcoal was dried in a stream of dry air to produce three portions of coated charcoal. Each of these portions, as well as an uncoated quantity of activated charcoal, was then placed in a separate column for adsorbing carbon dioxide thereon. The moisture content of the coated charcoal was reduced to a minimum value by passing dry, heated air through the column. Gaseous carbon dioxide was then introduced into the column to load the coated charcoal. Each of the charcoals adsorbed about 50 cc of $CO_2$/g.

The carbonation of water under ambient pressure conditions was then evaluated for the coated and uncoated coconut charcoal. Each test run was conducted as follows:

Eight ounces of distilled water were placed in a drinking glass and cooled to 5° C. Without stirring, two ice cubes together with 15 grams of the $CO_2$ loaded charcoal were added to the glass. The carbonation was measured as a function of time using an Orion specific ion $CO_2$ electrode and was reported in volumes of carbonation (cubic centimeters of $CO_2$ at STP per cubic centimeter of water).

The data for the uncoated charcoal and the three coated charcoals are presented in FIG. 1 where the volumes of carbonation are plotted against time. The uncoated charcoal produced a carbonation level of about 1.3 after 10 minutes. All of the coated charcoals produced a higher degree of carbonation. All coated charcoals produced a level above 1.5 in less than 5 minutes and achieved a level ranging from about 1.53 to about 1.63 after 15 minutes.

The sodium or potassium salts of these monomeric organic compounds produce similar results when utilized to coat activated charcoal for carbonation purposes.

EXAMPLE II

The use of similar coatings in zeolite 13X was also evaluated by the procedure of Example 1.

Figure 2A:
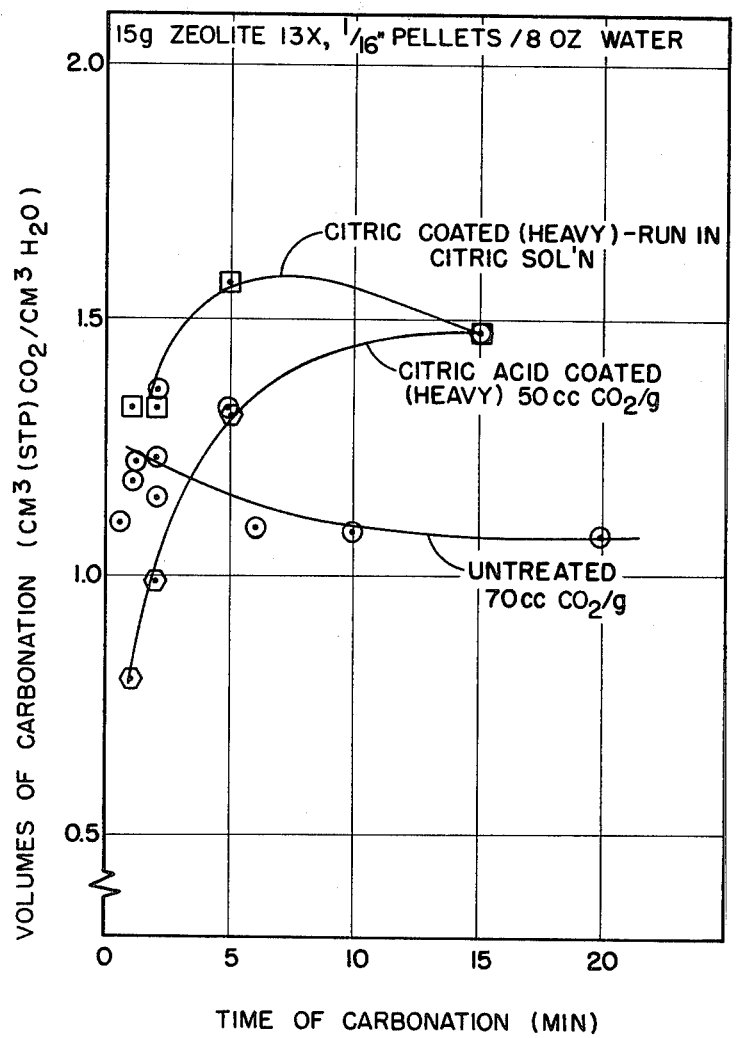
FIGS. 2a and b are graphs of the volumes of carbonation produced versus time by crystalline zeolites uncoated and coated with several different monomeric organic compounds.
Figure 2B:
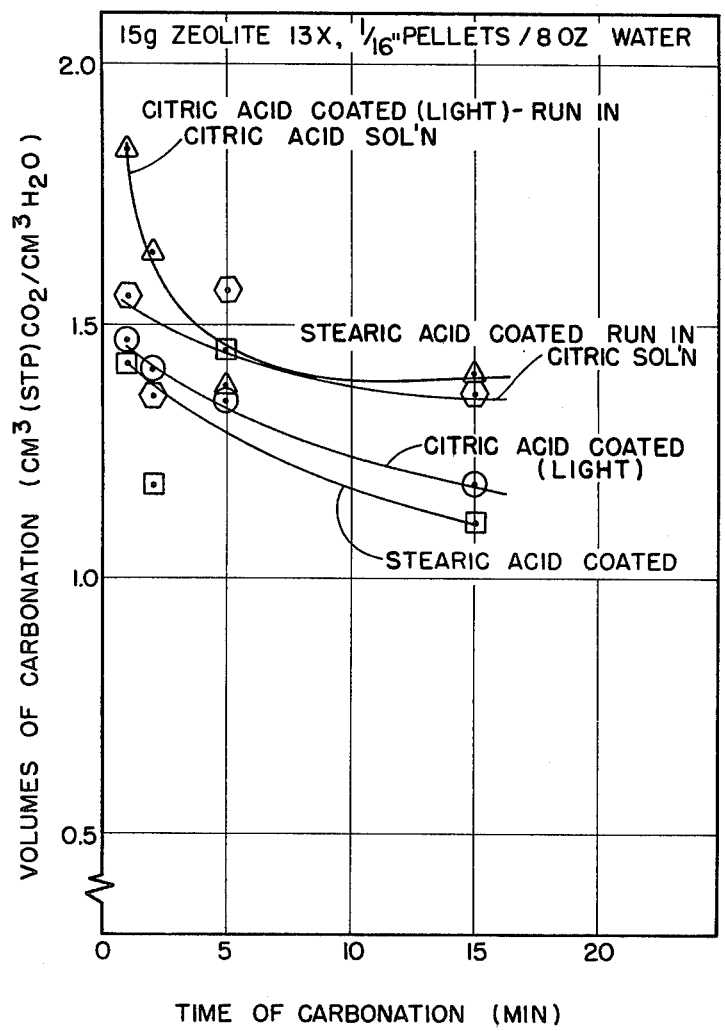

In the series of runs, coatings and citric acid and stearic acid were applied to the crystalline zeolite. Both light (less than 2 wt. %) and heavy (5–10 wt. %) coatings of citric acid were applied; only light coatings of stearic acid were applied. Carbonation of water and in some instances dilute aqueous solutions of citric acid were evaluated as in Example 1. The uncoated crystalline zeolite adsorbed about 70 cc of $CO_2$/g. while the coated zeolites adsorbed about 50 cc of $CO_2$/g. The data for the carbonation level obtained with the coated and uncoated crystalline zeolite 13X are presented in FIGS. 2a and b. The uncoated zeolite produced a carbonation level of about 1.08 after 15 minutes. The coated sieves produced a higher carbonation level in all instances with citric acid producing higher levels than stearic acid. Citric acid coatings achieved carbonation volumes of 1.40–1.48.

EXAMPLE III

A series of runs was made to evaluate the preparation of flavored carbonated beverages with the coated activated charcoals of Example 1.

Four runs were made with the citric acid coated (2%) coconut charcoal of Example 1 containing about 50 cc of $CO_2$/g. In a fashion similar to that of Example 1, the eight ounces of each of four liquids were carbonated with 15 grams of the charcoal and the effectiveness evaluated by measuring the volumes of carbonation. The results are presented in the table below:

| Run No. | Liquid | Volumes of Carbonation after 10 min. CC(STP) $CO_2$/cc $H_2O$ |
|---|---|---|
| 1 | Water | 1.76 |
| 2 | Water + dry beverage mix in particle form | 1.58 |
| 3 | Water + dry beverage mix in granulated form | 1.52 |
| 4 | Water + predissolved dry beverage mix | 1.31 |

Notes.
1. In Runs 2 and 3, the dry mix and charcoal were added simultaneously.
2. In Run 4, the dry mix was dissolved in the water before the charcoal was added.

These data show that the carbonation levels of flavored and sweetened beverages prepared from coated charcoal are not as high as that of carbonated water prepared in the same fashion. They also show that significantly higher levels of carbonation of flavored and sweetened beverages can be obtained if the dry beverage mix is added to the water together with the charcoal rather than pre-dissolving the dry mix.

What is claimed is:

1. A process of carbonating an aqueous beverage under atmospheric pressure comprising contacting said aqueous beverage with an amount of activated charcoal coated with a layer of an organic compound selected from the group consisting of di- or tri-carboxylic acid, a $C_{10}$–$C_{18}$ fatty acid, a monocyclic terpene and soluble salts thereof and having adsorbed in the charcoal at least 20 cm³ of carbon dioxide per gram of charcoal, said amount of activated charcoal being effective to produce in the beverage above 1.5 volumes of carbonation per volume of beverage in less than five minutes.

2. A process according to claim 1 wherein the tri-carboxylic acid is citric acid.

3. A process according to claim 1 wherein the fatty acid is lauric acid.

4. A process according to claim 1 wherein the monocyclic terpene is d-limonene.

5. A process according to claim 1 wherein the activated charcoal is coconut charcoal.

6. A process according to claim 1 wherein said activated charcoal is within a closed container having a removable or pierceable cover and including the additional step which is carried out prior to contacting said activated charcoal with said aqueous liquid which comprises:

removing or piercing said cover.

7. A process according to claim 6 wherein the aqueous liquid and the activated charcoal are contacted in the container.

8. A process according to claim 1 wherein the carbonation by the activated charcoal is supplemented by a chemical couple, said chemical couple being present in an amount which produces a salt concentration below the threshold level of salt taste.

* * * * *